(12) United States Patent
Aston et al.

(10) Patent No.: US 11,542,041 B2
(45) Date of Patent: Jan. 3, 2023

(54) ADDITIVELY MANUFACTURED SATELLITE PANEL WITH DAMPING

(71) Applicant: The Boeing Company, Chicago, IL (US)

(72) Inventors: Richard W. Aston, Brea, CA (US); Christopher David Joe, Arcadia, CA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 16/877,477

(22) Filed: May 18, 2020

(65) Prior Publication Data
US 2021/0354856 A1 Nov. 18, 2021

(51) Int. Cl.
*B64G 1/10* (2006.01)
*B64G 1/22* (2006.01)
*B22F 10/00* (2021.01)
*B33Y 10/00* (2015.01)
*B33Y 80/00* (2015.01)

(52) U.S. Cl.
CPC ............ *B64G 1/1007* (2013.01); *B22F 10/00* (2021.01); *B64G 1/10* (2013.01); *B64G 1/22* (2013.01); *B33Y 10/00* (2014.12); *B33Y 80/00* (2014.12)

(58) Field of Classification Search
CPC ....... B64G 1/10; B64G 1/22; B64G 2001/228
See application file for complete search history.

(56) References Cited

U.S. PATENT DOCUMENTS

| | | | |
|---|---|---|---|
| 3,376,684 A | 4/1968 | Cole et al. | |
| 3,976,269 A * | 8/1976 | Gupta | B64C 1/12 428/595 |
| 4,292,375 A | 9/1981 | Ko | |
| 4,757,665 A | 7/1988 | Hardigg | |
| 5,342,465 A | 8/1994 | Bronowicki et al. | |
| 5,958,551 A | 9/1999 | Garcia-Ochoa | |
| 6,207,256 B1 | 3/2001 | Tashiro | |
| 7,424,967 B2 | 9/2008 | Ervin et al. | |
| 9,403,606 B2 | 8/2016 | Aston et al. | |
| 9,745,736 B2 | 8/2017 | Wadley et al. | |
| 9,796,486 B1 | 10/2017 | Illsley et al. | |
| 10,392,135 B2 | 8/2019 | Smith et al. | |
| 10,407,189 B1 | 9/2019 | Freestone et al. | |

(Continued)

FOREIGN PATENT DOCUMENTS

| | | |
|---|---|---|
| CN | 106694884 A | 5/2017 |
| CN | 208392799 U | 1/2019 |

(Continued)

OTHER PUBLICATIONS

European Patent Office, Extended European Search Report regarding European Patent Application No. 21168773.6, dated Oct. 19, 2021, 9 pages.

(Continued)

*Primary Examiner* — Nicholas McFall
(74) *Attorney, Agent, or Firm* — Kolisch Hartwell, P.C.

(57) ABSTRACT

A satellite is disclosed, including a body having an additively manufactured wall panel and a communication device connected to the body. The wall panel includes a facesheet and a stiffening structure extending from a first side of the facesheet. The communication device is configured to send and receive data while in space.

20 Claims, 10 Drawing Sheets

(56) References Cited

U.S. PATENT DOCUMENTS

| | | |
|---|---|---|
| 10,538,347 B1 | 1/2020 | Turner et al. |
| 10,589,878 B2 | 3/2020 | Veto et al. |
| 2004/0074206 A1 | 4/2004 | Tanase et al. |
| 2006/0107611 A1 | 5/2006 | Merrifield |
| 2006/0185277 A1 | 8/2006 | Quincieu |
| 2009/0193749 A1 | 8/2009 | Gembol |
| 2011/0120080 A1* | 5/2011 | Schwark, Jr. ............. F02K 1/09 |
| | | 60/226.3 |
| 2011/0283873 A1 | 11/2011 | Wadley et al. |
| 2013/0000247 A1 | 1/2013 | Sypeck |
| 2014/0041231 A1* | 2/2014 | Andrews ................ B21D 19/00 |
| | | 29/897.2 |
| 2014/0103164 A1 | 4/2014 | Aston et al. |
| 2014/0131521 A1 | 5/2014 | Upland et al. |
| 2015/0004371 A1 | 1/2015 | Noble |
| 2015/0017383 A1 | 1/2015 | Yang et al. |
| 2015/0048209 A1 | 2/2015 | Hoyt et al. |
| 2015/0175210 A1 | 6/2015 | Raymond |
| 2015/0298423 A1 | 10/2015 | Holemans |
| 2016/0237836 A1 | 8/2016 | Harris |
| 2016/0282067 A1* | 9/2016 | Aston .................. H05K 7/2039 |
| 2016/0288926 A1* | 10/2016 | Smith .................... B64G 1/506 |
| 2016/0340061 A1 | 11/2016 | Bose et al. |
| 2017/0036783 A1 | 2/2017 | Snyder |
| 2017/0284094 A1 | 10/2017 | Kim et al. |
| 2018/0194096 A1 | 7/2018 | Martial Somda et al. |
| 2018/0194494 A1 | 7/2018 | Dube |
| 2018/0229443 A1 | 8/2018 | Pham et al. |
| 2018/0229863 A1 | 8/2018 | Veto et al. |
| 2018/0251238 A1 | 9/2018 | Cherrette |
| 2018/0251241 A1 | 9/2018 | Burt |
| 2018/0281339 A1 | 10/2018 | Hull et al. |
| 2019/0002133 A1 | 1/2019 | Peterka, III et al. |
| 2019/0202163 A1 | 7/2019 | Yeh et al. |
| 2019/0315501 A1 | 10/2019 | Duong et al. |
| 2019/0337220 A1 | 11/2019 | Beyerle et al. |
| 2021/0061495 A1 | 3/2021 | Aston et al. |
| 2021/0354859 A1 | 11/2021 | Aston et al. |
| 2021/0356015 A1 | 11/2021 | Aston et al. |

FOREIGN PATENT DOCUMENTS

| | | |
|---|---|---|
| CN | 109317677 A | 2/2019 |
| CN | 111532452 A | 8/2020 |
| EP | 3034208 A1 | 6/2016 |
| EP | 3333474 A1 | 10/2017 |
| EP | 3785828 A1 | 3/2021 |
| WO | 2017169080 A1 | 10/2017 |

OTHER PUBLICATIONS

European Patent Office, Extended European Search Report regarding European Patent Application No. 21168768.6, dated Oct. 19, 2021, 11 pages.

Zhang, Xiaoyu et al. "Vibration tests of 3D printed satellite structure made of lattice sandwich panels." AIAA Journal 56.10 (Oct. 1, 2018): 4213-4217.

European Patent Office, Extended European Search Report regarding European Patent Application No. 20189687.5, dated Feb. 1, 2021, 11 pages.

Steven M. Huybrechts et al., "Grid Stiffened Structures: A Survey of Fabrication," Analysis and Design Methods, 1999, 10 Pages, Space Vehicles Directorate, Air Force Research Lab, Kirtland AFB, New Mexico, and Boeing Space and Defense, The Boeing Company, Seattle, Washington.

Peter Torvik, "Analysis of Free-Layer Damping Coatings," Key Engineering Materials, Mar. 15, 2007, 22 Pages, vol. 333, Trans Tech Publications, Switzerland.

Christian Carpenter, et al. "Test Results for the MPS-120 and MPS-130 CubeSat Propulsion Systems." Aerojet Rocketdyne, 2014, 32 pages.

Braden Grim et al., "MakerSat-o: 3D-Printed Polymer Degradation First Data from Orbit," ResearchGate Conference Paper, Aug. 2018, 7 pages.

Elwood Agasid et al., "State of the Art Small Spacecraft Technology," Small Spaceciall Systems Virtual Institute, Dec. 2018, 207 Pages, Nasa Center for AeroSpace Information, Hanover, Maryland.

European Patent Office, Extended European Search Report regarding European Patent Application No. 21214774.8, dated Apr. 21, 2022, 7 pages.

European Patent Office, Extended European Search Report regarding European Patent Application No. 21214809.2, dated Apr. 25, 2022, 9 pages.

U.S. Patent and Trademark Office, Non-Final Office Action regarding U.S. Appl. No. 16/554,150, dated Jan. 21, 2022, 33 pages.

Morrett, Robert, Sep. 10, 2015, "Selecting a filler metal: Seven factors to consider", Plant Engineering. https://www.plantengineering.com/articles/selecting-a-filler-metal-seven-factors-to-consider/ (Year: 2015).

U.S. Patent and Trademark Office, Final Office Action regarding U.S. Appl. No. 16/554,150, dated May 31, 2022, 19 pages.

* cited by examiner

ADDITIVELY MANUFACTURED SATELLITE PANEL WITH DAMPING

BACKGROUND

Space presents a uniquely hostile environment for spacecraft such as satellites. Vibrational loading during launch can be particularly injurious to payload equipment, in addition to the danger of damaging radiation and orbital debris impact. Many satellite panels are constructed of multiple components fastened together, which provide inherent structural damping. However, such designs can be expensive and labor intensive to manufacture. Additive Manufacturing (AM) is quickly gaining popularity in many industries as a method of rapid production at relatively low cost. AM, sometimes known as three-dimensional (3D) printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often the raw material is in the form of granules or powder, applied as a layer and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM), among others.

AM parts are monolithic, without structural joints and therefore with low inherent structural damping. New designs for satellite components such as structural panels are needed to compensate for this difference and enable efficient use of AM methods.

SUMMARY

The present disclosure provides systems, apparatuses, and methods relating to additively manufactured satellite panels. In some examples, a satellite may include a body having an additively manufactured wall panel and a communication device connected to the body. The wall panel may include a facesheet and a stiffening structure extending from a first side of the facesheet. The communication device may be configured to send and receive data while in space.

In some examples, a wall panel for a satellite may include an additively manufactured expanse having a first side and a second side, and a stiffening structure on the first side of the expanse. The expanse may be configured to form part of an external wall structure of a satellite, and the second side of the expanse may be configured for supporting satellite equipment.

In some examples, a method of manufacturing a satellite may include printing a wall panel including a facesheet and printing a stiffening structure on the facesheet. The method may further include assembling the wall panel into an external wall structure of a satellite.

In some examples, a wall panel for a satellite may include an additively manufactured expanse configured to form part of an external wall structure of the satellite. The expanse may have a first side and a second side, and the wall panel may further include a damping layer adhered to the first side of the expanse. Features, functions, and advantages may be achieved independently in various examples of the present disclosure, or may be combined in yet other examples, further details of which can be seen with reference to the following description and drawings.

DETAILED DESCRIPTION

Figure 1:
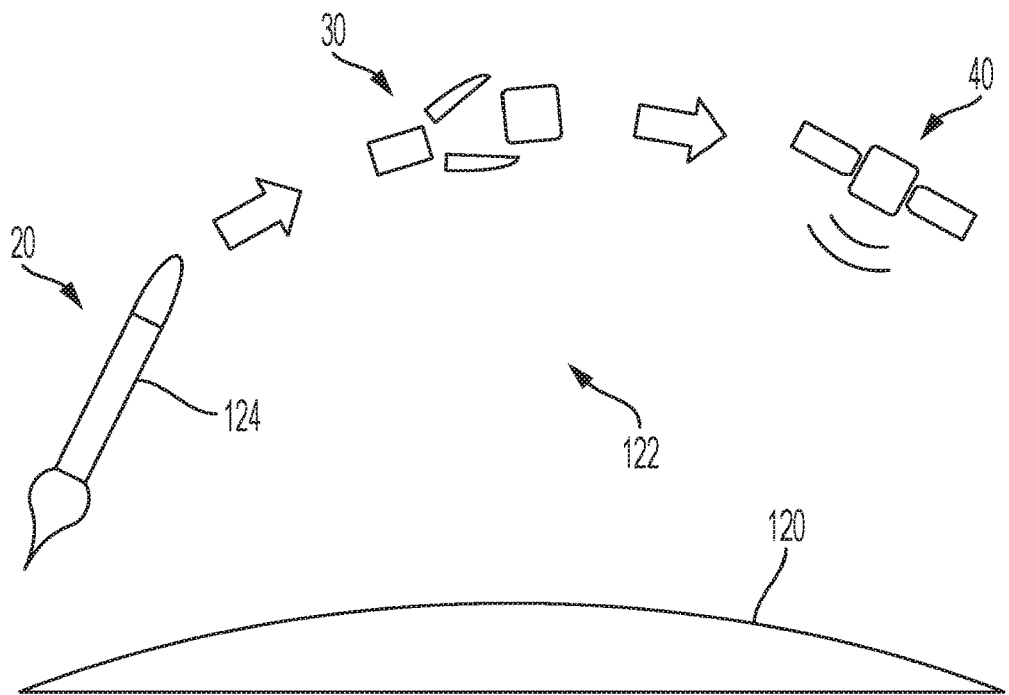
FIG. 1 is schematic diagram of an illustrative satellite.

Various aspects and examples of satellites having an additively manufactured panel, as well as related apparatus and methods, are described below and illustrated in the associated drawings. Unless otherwise specified, a satellite in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, an additively manufactured satellite panel in accordance with the present teachings may include a facesheet and a stiffener. Such a panel may also be described as a spacecraft panel, a wall panel, an expanse, a wall section, and/or a satellite primary structure.

The facesheet may have an inner side and an outer side, such that when the panel is assembled into a satellite, the inner side faces an interior of the satellite and the outer side faces an exterior environment. The stiffener may be located on the inner and/or the outer side of the facesheet, according to a functionality of the panel. For example, where the panel is configured to radiate heat, the stiffener may be disposed on the inner side of the facesheet such that the outer side may be flat to facilitate effective radiation. For another example, where the panel is configured to support equipment, the stiffener may be disposed on the outer side of the facesheet such that mounting of the equipment to the inner side is unimpeded. For another example, the stiffener may comprise a truss sandwiched between two facesheets.

The stiffener may extend from the facesheet, and may have any shape effective for providing desired stiffness to the facesheet. For example, the stiffener may include perpendicular web and flange portions. The stiffener may form a pattern on the facesheet such as a grid or array of polygons including but not limited to triangles and/or squares.

The panel may be designed for additive manufacture. For example, all surfaces of the stiffener may be oriented at an angle of 45 degrees or less relative to a build axis, such that the stiffener is printable without use of sacrificial support structures, commonly referred to as secondary supports. The facesheet, stiffener, and/or additional structures may be printed as a single monolithic structure.

In many examples, the panel may further include a damping layer. The layer may be applied to the facesheet and/or the stiffener of the panel subsequent to additive manufacture of the facesheet and the stiffener. For example, the layer may be bonded to a flange portion of the stiffener.

The damping layer may comprise any material suitable for desired damping. For example, the damping layer may comprise a high loss material effective in asymmetric free-layer damping. Examples include but are not limited to elastomer, rubber, acrylic tape, silicone, and other viscoelastic materials. Properties of the damping layer such as thickness, stiffness, loss factor, and/or distribution may be tuned according to the sinusoidal loading, impact loading, and/or random vibration expected on the panel.

The panel may be configured to withstand conditions associated with launch into and operation in outer space. For example, the facesheet and stiffener may comprise a light but strong metal such as a laser sintered aluminum alloy, and the damping layer may comprise a heat tolerant, radiation resistant elastomer.

Examples, Components, and Alternatives

The following sections describe selected aspects of exemplary satellite panels as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Satellite and Associated Method

Figure 2:
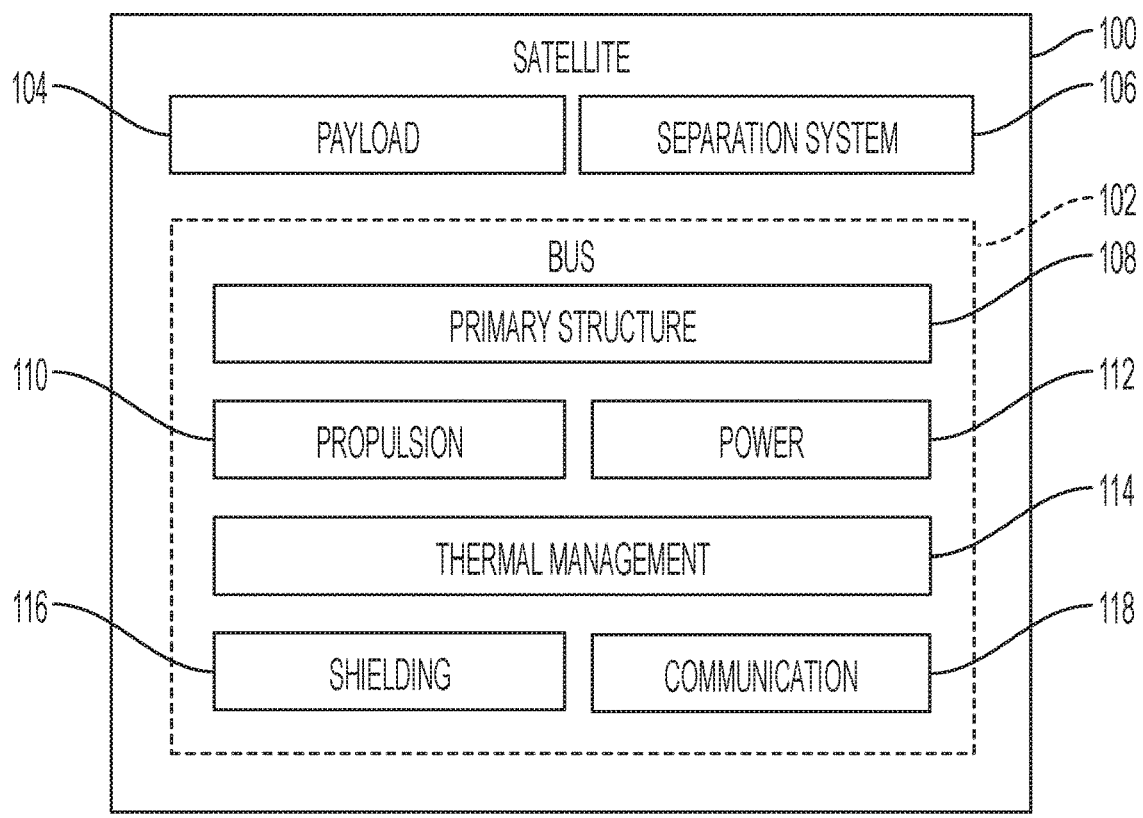
FIG. 2 is a block diagram of the satellite of FIG. 1.
Figure 3:
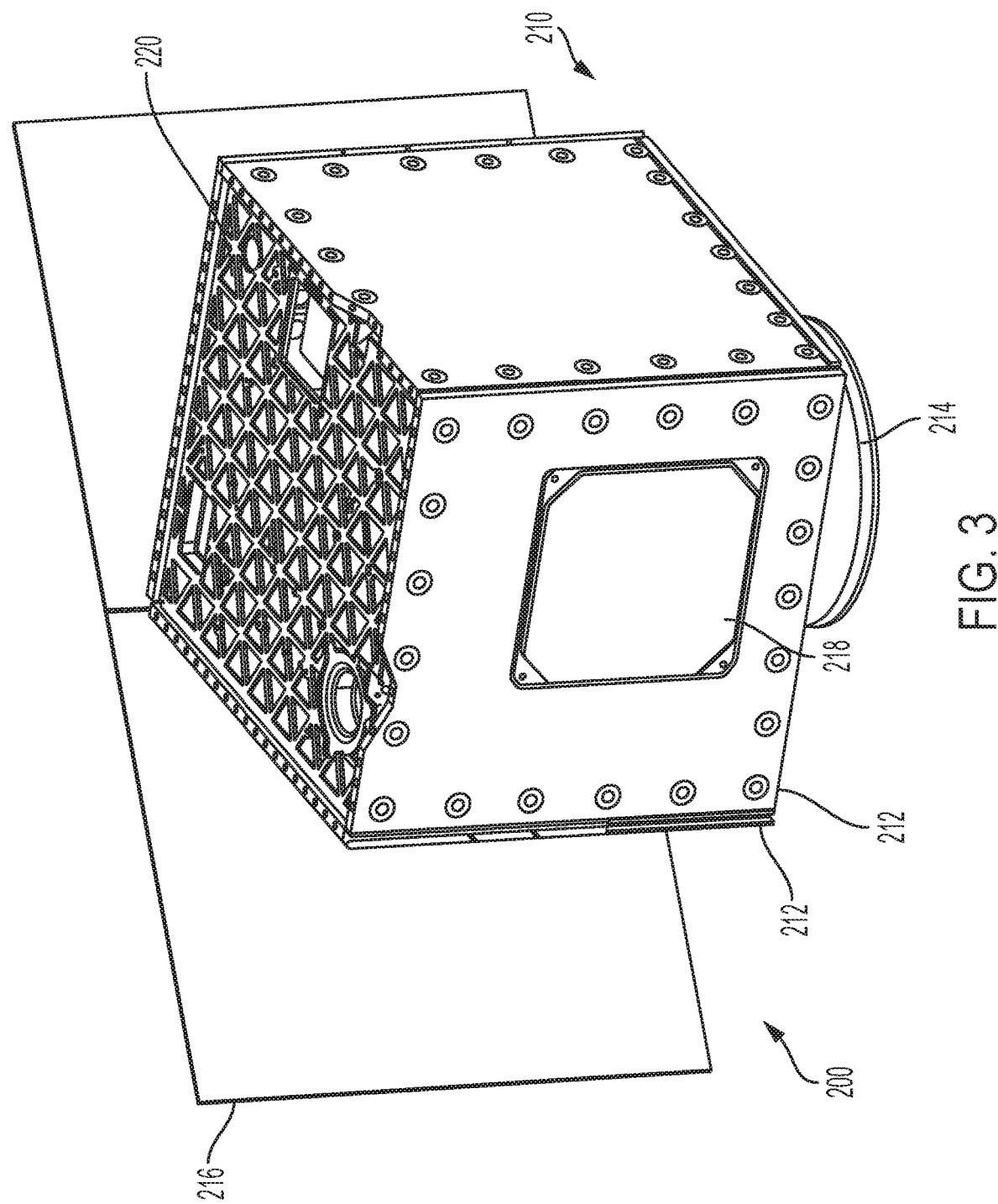
FIG. 3 is an isometric view of an illustrative satellite in accordance with aspects of the present disclosure.

Examples disclosed herein may be described in the context of an illustrative satellite launch method (see FIG. 1) and an illustrative satellite 100 (see FIGS. 1 and 2). In the present example, the method includes three phases: a launch phase 20, a separation phase 30, and a deployment phase 40. Launch phase 20 may include transporting satellite 100 from a planetary body 120 such as Earth to outer space 122, which may also be referred to as space, using a launch vehicle 124. In the context of Earth, outer space may comprise a region beyond the Karman line. Separation phase 30 may include separating satellite 100 from launch vehicle 124, once a desired location, trajectory and/or orbit has been achieved. Deployment phase 40 may include preparation of satellite 100 for operation, such as establishing communication with a controller on planetary body 120, extending solar panels or instrument arms, and/or maneuvering to a desired orientation relative to the planetary body. In some examples, the method may further include design, production, and/or in-service phases.

Each of the processes of the launch method may be performed or carried out by a system integrator, a third party, and/or an operator (e.g., a customer). For the purposes of this description, a system integrator may include, without limitation, any number of aerospace manufacturers and major-system subcontractors; a third party may include, without limitation, any number of vendors, subcontractors, and suppliers; and an operator may be an telecommunications company, leasing company, military entity, service organization, and so on. Apparatuses and methods shown or described herein may be employed during any one or more of the stages of the satellite launch method.

As shown in FIG. 2, satellite 100 may include a bus 102 with a plurality of satellite systems, a payload 104 and a separation system 106. Examples of the plurality of systems include one or more of a primary structure 108, a propulsion system 110, an electrical power system 112, a thermal management system 114, a radiation shielding system 116, and a communication system 118. Primary structure 108 may comprise a body, a main body, a housing, a wall structure, and/or a frame. Payload 104 may include but is not limited to satellite equipment, scientific instruments, and/or piggy-back communications equipment.

Each system may comprise various subsystems, such as controllers, processors, actuators, effectors, motors, generators, etc., depending on the functionality involved. Any number of other systems may be included. Although an unmanned artificial satellite example is shown, the principles disclosed herein may be applied to other aerospace vehicles and technology, such as a launch vehicle, space station, crewed spacecraft, and/or interstellar probe.

B. Illustrative Satellite with an Additively Manufactured Equipment Panel

As shown in FIGS. 3-8, this section describes an illustrative satellite 200. Satellite 200 is an example of a satellite 100 and includes an equipment panel 220 which is an example of an additively manufactured satellite panel, as described above. Satellite 200 is generally cuboidal in shape, and may be described as a cubesat and/or a micro-satellite. The satellite includes a main body 210 which forms the primary structure of the satellite, and is an example of primary structure 108 as described in Example A. Main body 210 and is made up of a plurality of approximately square wall panels 212 fastened together. Main body 210 may also be described as a housing, while wall panels 212 may be described as an external wall structure. In the depicted example, main body 210 is between approximately ten and thirty inches in width.

A separation system 214, solar panels 216, and plate antenna 218 are mounted to main body 210. Separation system 214 is an example of separation system 106 as described in Example A. The separation system may be described as a launch vehicle interface ring, and is configured to act as a sole connection between satellite 200 and a vehicle during launch, then facilitate disconnection of the satellite from the vehicle. Solar panels 216 are part of a power system such as power system 112 described in Example A, and are configured to supply satellite 200 with electrical power. Plate antenna 218 is part of a communication system such as communication system 118 described in Example A, and is configured to send and receive data in cooperation with communications equipment of the satellite while in space.

Wall panels 212 include equipment panel 220, located opposite separation system 214. The equipment panel is configured to support and protect satellite equipment (not depicted), during launch and operation. The equipment may include payload equipment such as sensors, optics, and/or processing systems, and/or may include satellite systems equipment such as electrical components and/or communications equipment. Equipment panel 220 may protect mounted equipment by damping vibration resulting from launch of satellite 200, and by shielding the equipment from potentially damaging space radiation.

In the depicted example, separation system 214 is a band-style separation system such as a clamp band or Motorized Light Band (MLB). Using this separation system, satellite 200 may be mounted to a launch vehicle with a central axis of the separation system aligned with a launch vector of the launch vehicle. Equipment panel 220 is located opposite separation system 214 to allow the equipment panel to most effectively damp axial loads during launch. For satellites employing other separation systems such as a dispenser-style Quadpack or Canisterized Satellite Dispenser (CSD), equipment panel 220 may be disposed in other positions relative to separation system 214.

Equipment panel 220 is configured and positioned according to the mounted equipment. That is, design and location of equipment panel 220 may be selected according to properties or requirements of the specific equipment mounted to the equipment panel. For example, equipment panel 220 may be located on a side of satellite 200 expected to face toward the sun in order to shield radiation-sensitive equipment from solar wind. For another example, stiffness and damping properties of equipment panel 220 may be tuned according to resonant frequencies of selected payload equipment, as discussed further below in reference to FIG. 8.

Figure 4:
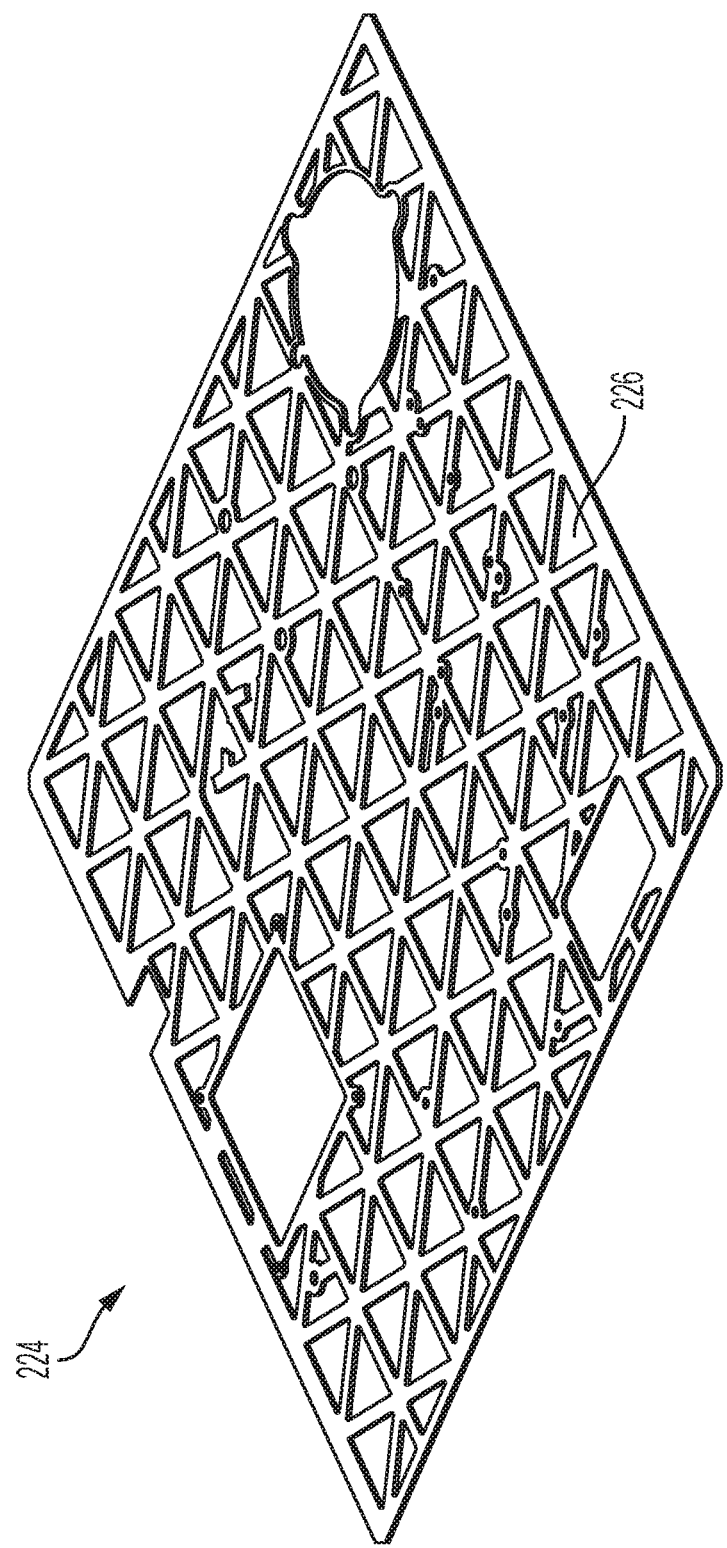
FIG. 4 is an isometric view of the damping layer of the satellite of FIG. 3.

Equipment panel 220 includes an additively manufactured (AM) panel 222, and a damping layer 224 shown in FIG. 4. In this example, damping layer 224 has a grid pattern of equilateral triangles 226, which corresponds to a pattern of the AM panel. Other patterns may be used. The damping layer also includes apertures and deviations from the grid pattern, which conform to customized structures of the additively manufactured panel, as described further below, with reference to FIG. 7.

Damping layer 224 may comprise any high loss-factor material appropriate to asymmetric free-layer damping. In the present example the damping layer includes a synthetic rubber having a hardness between approximately 20 and 60 on the Shore A hardness scale. In some examples, the damping layer may include a material having a hardness between approximately 10 and 100 on the Shore A hardness scale. However, a hardness between 20 and 60 is preferable in the present case as sufficiently soft for effective vibration damping, while having good structural stiffness. Hardness of the material may be evaluated according to a widely recognized testing standard such as ASTM D2240 or ISO 7619. The material or materials of damping layer 224 may be selected according to desired damping properties of the layer. For example, a greater hardness may be used to improve damping at a resonant frequency of payload equipment.

Figure 5:
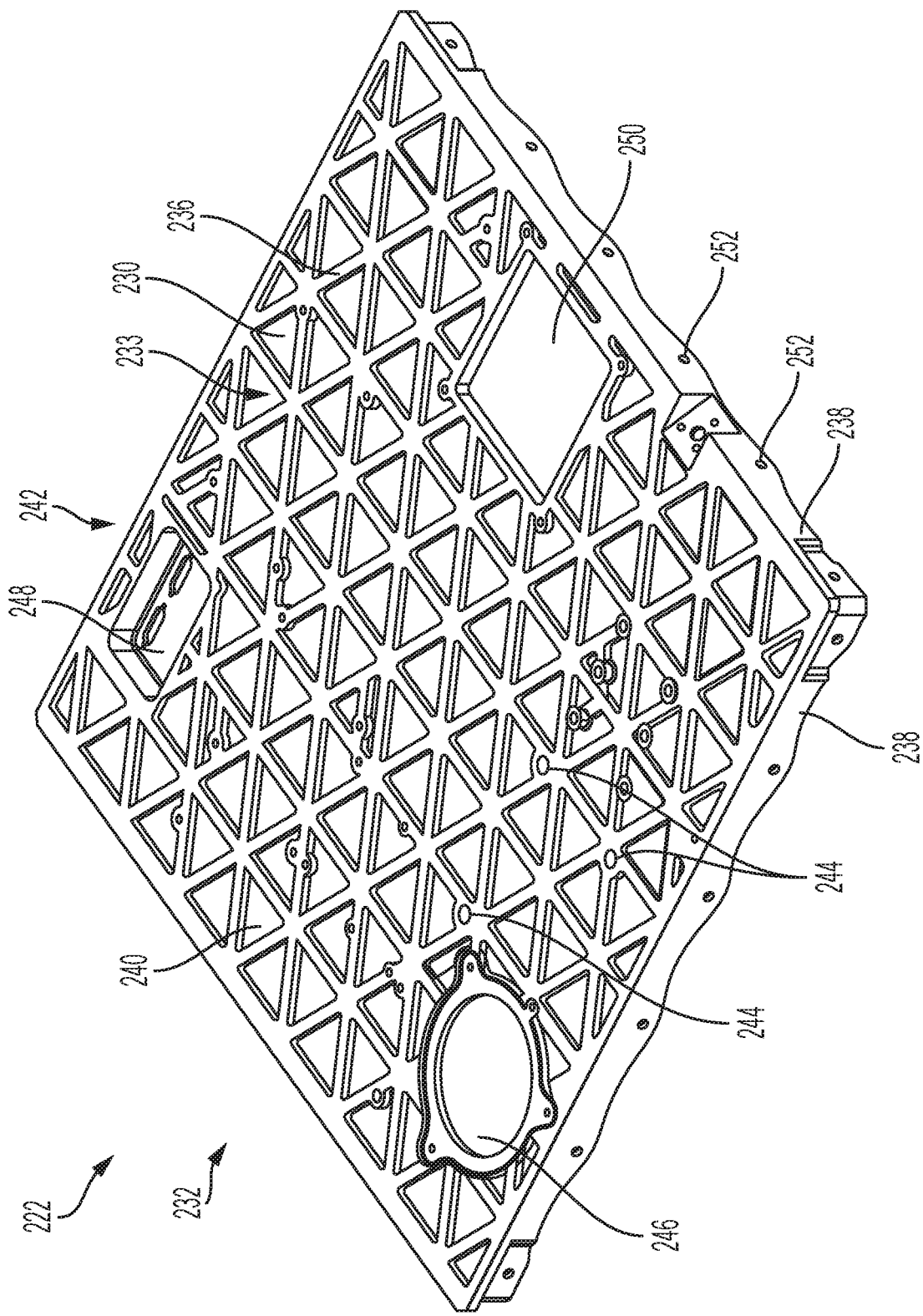
FIG. 5 is an isometric top view of the additively manufactured panel of the satellite of FIG. 3
Figure 6:
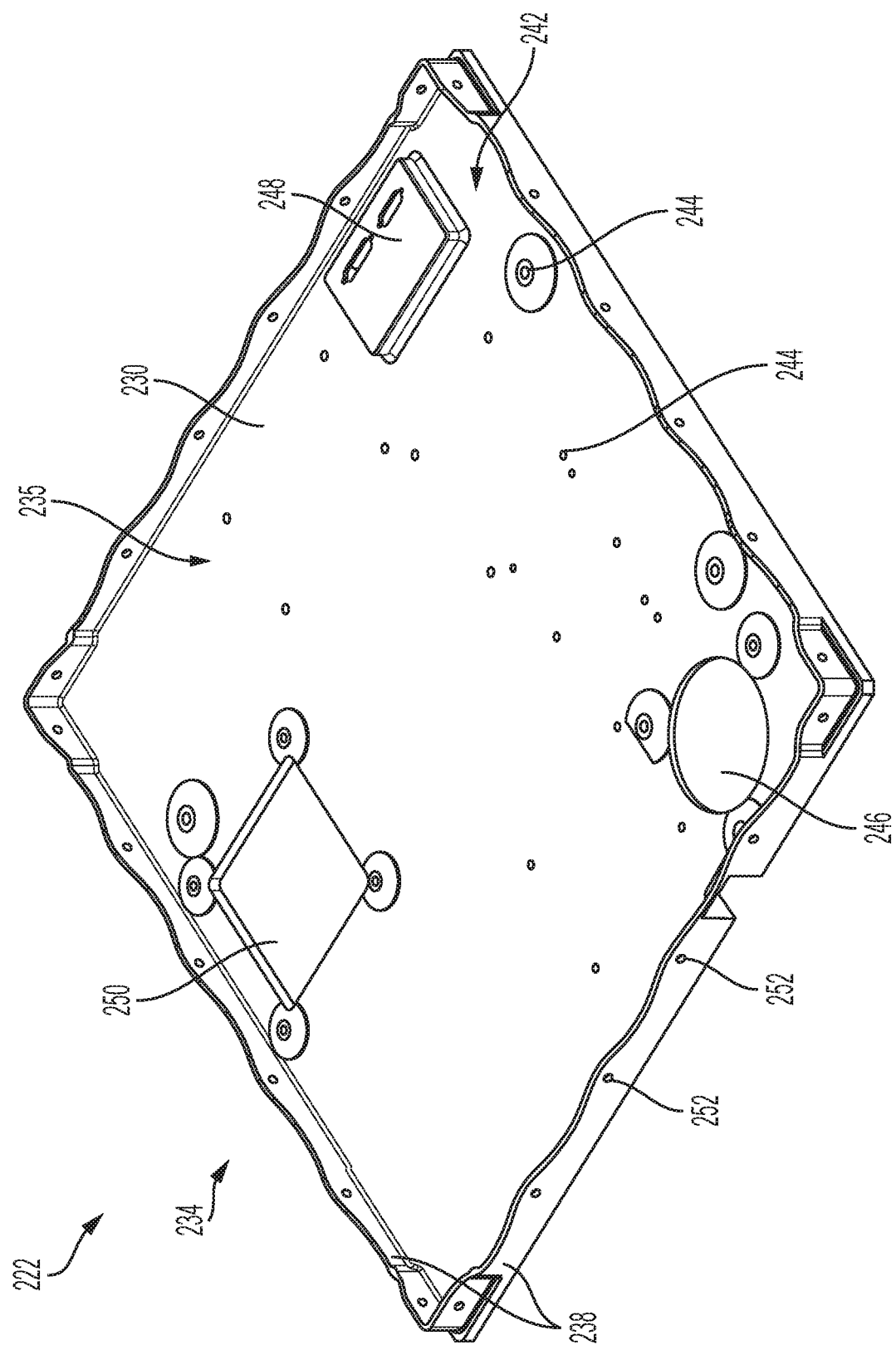
FIG. 6 is an isometric bottom view of the additively manufactured panel of FIG. 5.

FIGS. 5 and 6 show an exterior side 232 and an interior side 234 of AM panel 222, respectively. The AM panel includes a facesheet 230, which is generally square and planar and may also be described as a plate. Facesheet 230 has a first side 233, a second side 235, and four linear outer edges. Extending from first side 233 of the facesheet, on exterior side 232 of the panel, is a stiffening structure 236. A majority of stiffening structure 236 forms a grid of equilateral triangles 240. Together, facesheet 230 and stiffening structure 236 may be described as an isogrid or an isogrid panel.

In the present example, facesheet 230 is shaped for a cuboidal satellite. In some examples, the facesheet may have other shapes appropriate to other satellite designs. For example, facesheet 230 may have a triangular, pentagonal, or irregular shape.

Stiffening structure 236 may form any pattern appropriate to a desired stiffness of AM panel 222. For example, the stiffening structure may form a rectangular grid and/or may form a grid of varying density to allow location-variant stiffness. Some patterns of stiffening structure 236 may be preferable, as more efficient for additive manufacture, as described further below with reference to FIG. 8.

AM panel 222 further includes a plurality of customized structural features 242. The customized features may vary according to the mounting, connection, shielding and/or view factor requirements of payload and/or operational equipment of the satellite, as well as launch method, weight constraints, or any other relevant considerations. The additive manufacture of panel 222 may facilitate these customized features, allowing a standardized design to be quickly and cheaply modified for each satellite produced.

In the depicted example, customized structural features 242 include a plurality of threaded fastener apertures 244, a fluid exchange connection 246, an external mount recess 248, and a star tracker view window 250. Other potential customized structural features not included in the present example include electrical connections, solar panel and/or antenna mounts, and a pattern of apertures matching a communications array. Customized structural features 242 may be built into facesheet 230 and/or stiffening structure 236. For instance, fluid exchange connection 246 includes an aperture through facesheet 230 and a modification to stiffener 236 to define a recess to receive a seal.

Extending from the outer edges of the facesheet are four side walls 238. In the present example, the side walls extend toward an interior of the satellite when AM panel 222 is assembled into the main body of the satellite. Side walls 238 are configured to facilitate connection of AM panel 222 to the other panels of the main body of the satellite. As shown in FIGS. 5 and 6, the side walls have a scalloped edge to allow a desired location of a plurality of fastener holes 252 relative to facesheet 230, while minimizing material and weight of AM panel 222. In some examples, AM panel 222 may include other connection features in addition to or in place of side walls 238.

As shown in FIG. 6, interior side 234 of facesheet 230 is flat, apart from customized structural features 242. Locating the stiffening structure on the exterior side of the facesheet may facilitate mounting of equipment to interior side 234 and/or increase available space inside the satellite.

In the depicted example, AM panel 222 comprises a laser-sintered aluminum alloy and is printed using direct metal laser sintering (DMLS). In general, the panel may include any material with properties such as strength, stiffness, and weight that are appropriate for a satellite, and may be manufactured by any effective additive manufacturing method.

For example, AM panel 222 may be produced from a polymer with fused deposition modeling (FDM) or may be produced from a titanium alloy with electron beam melting (EBM).

Figure 7:
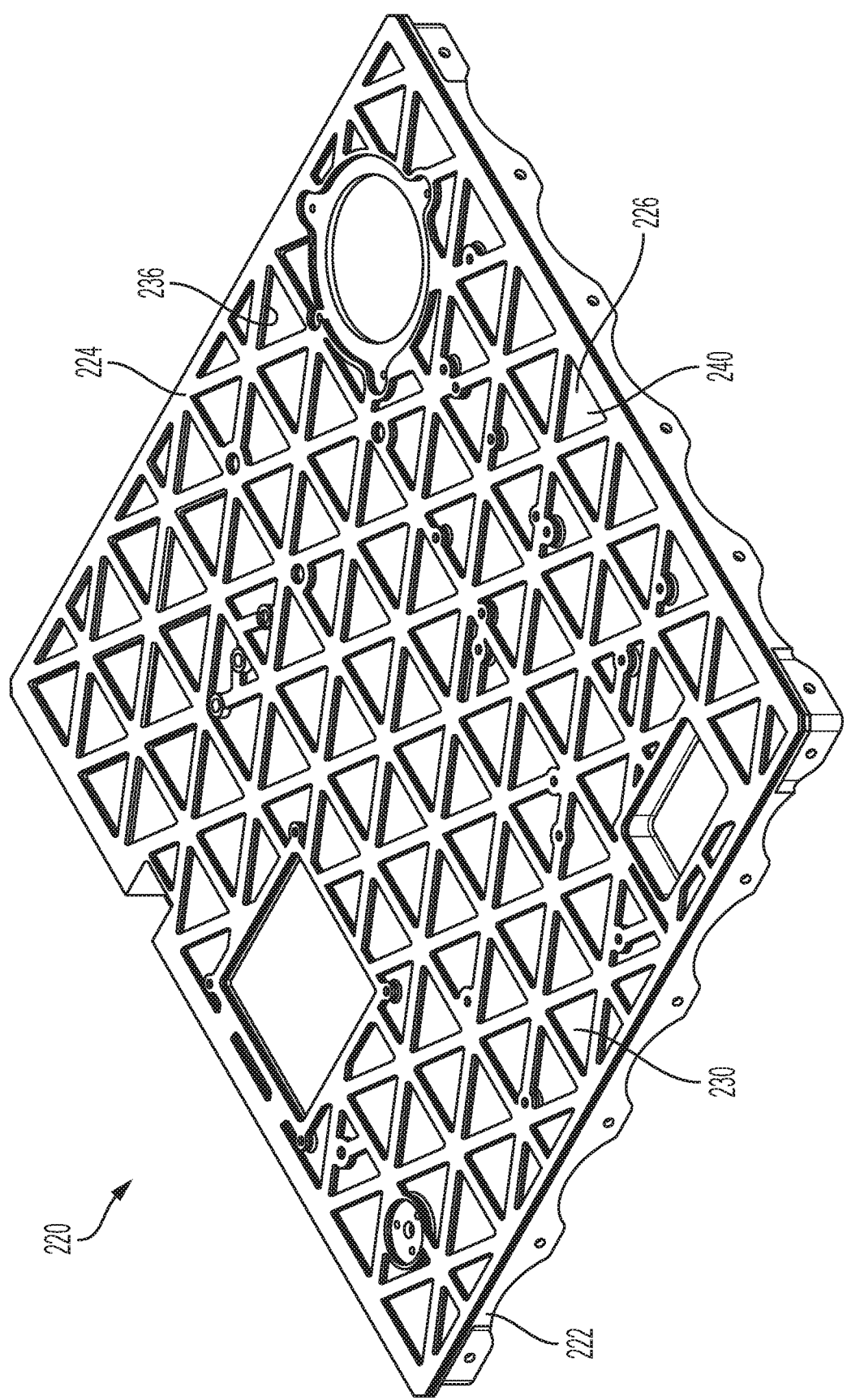
FIG. 7 is an isometric top view of the equipment panel of the satellite of FIG. 3, including the additively manufactured panel and attached damping layer.

FIG. 7 shows equipment panel 220 with damping layer 224 applied to AM panel 222. In the present example, damping layer 224 is applied to stiffening structure 236 of the AM panel, and is shaped to conform to the stiffening structure. That is, damping layer 224 has the same layout and grid-shape as an uppermost surface of stiffening structure 236. Damping layer 224 may be described as corresponding to stiffening structure 236 and/or as substantially covering the stiffening structure. In some examples, damping layer 224 may be applied to facesheet 230, to the facesheet and the stiffening structure, and/or to some portion of the facesheet and/or stiffening structure. The damping layer may conform to features of AM panel 222, and/or may have a partially or entirely independent pattern and/or shape. For example, the damping layer may be applied to a flat facesheet without a stiffener, as a sheet substantially covering a side of the facesheet or as a grid pattern only partially covering a side of the facesheet. In general, damping layer 224 may be applied to any structure of the satellite and/or in any location on the satellite appropriate for effective damping. Damping layer 224 may be a single continuous layer, as in the depicted example, or may comprise two or more discrete sections.

Damping layer 224 may be attached to AM panel 222 by any effective means. In the present example, the synthetic rubber damping layer is separately molded and then bonded to the AM panel with a pressure sensitive adhesive. In some examples, the material of damping layer 224 may be applied to the AM panel in a fluid and/or malleable form and then cured and/or dried. Preferably, damping layer 224 may be bonded, adhered, or otherwise attached to AM panel 222 at all points of contact in order to facilitate effective vibration transfer and damping.

Figure 8:
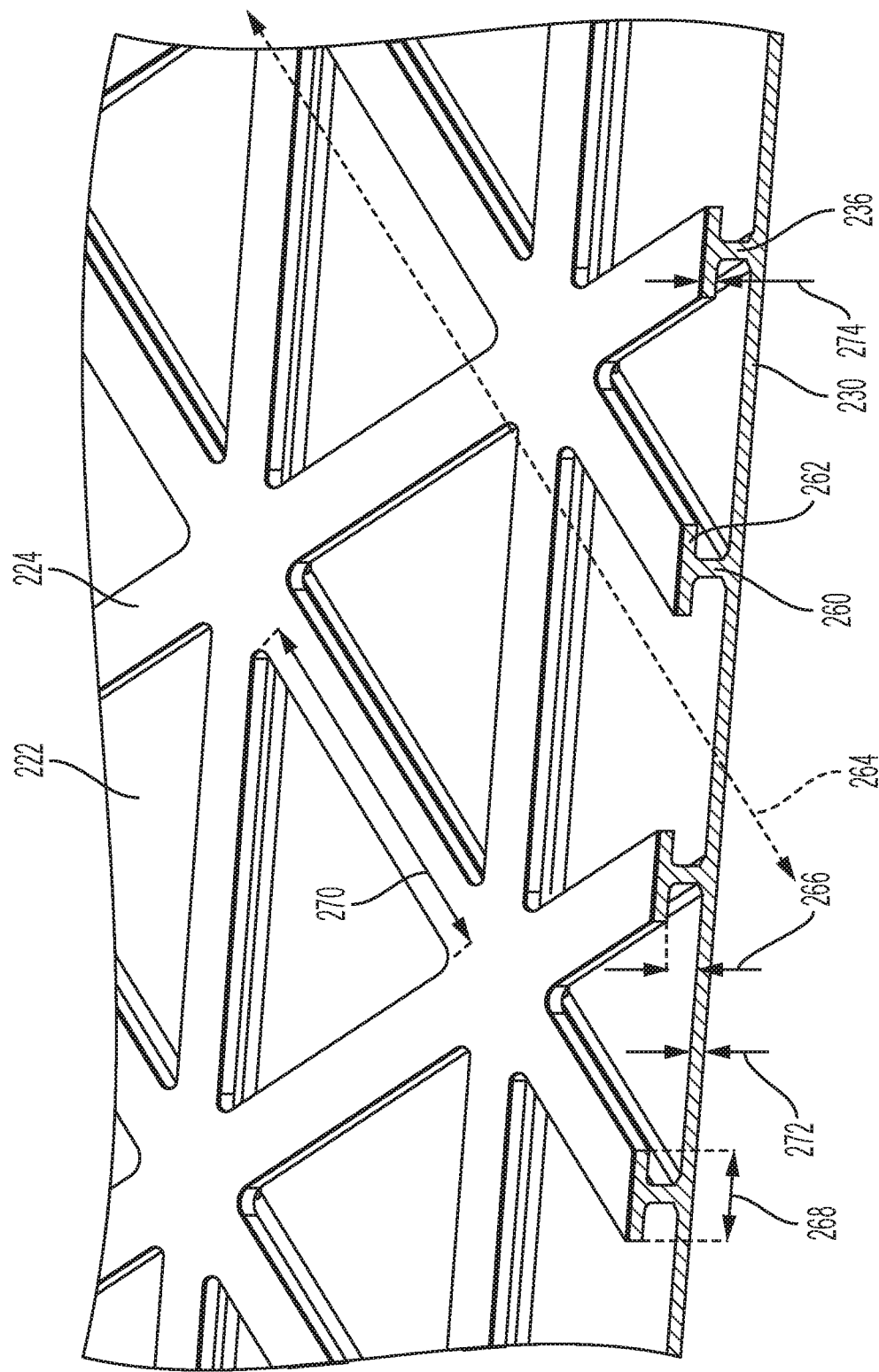
FIG. 8 is a close-up cut-away view of the equipment panel of FIG. 7.

FIG. 8 is a partial cut-away view of equipment panel 220, showing stiffening structure 236 in more detail. Stiffening structure 236 may be described as an isogrid flange stiffener and/or as a T-beam. In combination with facesheet 230, the stiffening structure may be described as forming I-beams and/or may be described as a flanged isogrid panel. The stiffening structure includes a web portion or web 260 and a flange portion or cap 262.

Web 260 extends from exterior side 232 of facesheet 230, perpendicular to the facesheet. Cap 262 is centered on web 260, spaced from facesheet 230 by the web, and extends parallel to the facesheet. The cap may also be described as extending in two opposing directions from a distal end of web 260. Damping layer 224 is applied to an upper surface of cap 262.

In some examples, stiffening structure 236 may have alternative geometries. For instance, the stiffening structure may include only web 260 or cap 262 may extend in only one direction from the distal end of the web. The depicted I-beam geometry of the stiffening structure may be preferable, as providing stiffness with minimal additional weight and also both facilitating connection of damping layer 224 and enhancing the damping effectiveness of the layer.

As shown in FIG. 8, stiffening structure 236 and facesheet 230 are monolithic. That is, AM panel 222 is printed as a single unit. Web 260 and cap 262 are each generally planar and/or plate-like, and extend linearly to form grid of triangles 240. At intersection points of the grid, the web and cap may be described as forming a node having a round and/or hexagonal shape. Both linear portions and nodes of the web and cap may be configured for printing without use of sacrificial or secondary supports.

AM panel 222 may be printed in a series of layers perpendicular to a build axis 264. The build axis may be defined by the orientation of AM panel 222 relative to a printer or other additive manufacturing equipment during printing. Stiffening structure 236 may be configured for printing without use of secondary supports, and more specifically may be oriented relative to build axis 264 such that the stiffening structure is printable without secondary supports. For instance, web 260, cap 262, and the overall pattern of the stiffening structure may form angles of no more than 45 degrees relative to build axis 264. Grid of equilateral triangles 240 may facilitate this orientation, where other patterns such as squares may not have an orientation conforming to this angle requirement.

Dimensions of stiffening structure 236 may be tuned to achieve desired stiffness of equipment panel 220, and/or to achieve desired damping properties of damping layer 224. Web 260 has a depth 266 and cap 262 has a width 268. In the present example, web depth 266 is between approximately 0.1 and 0.3 inches and cap width 268 is between approximately 0.25 and 0.75 inches. Each triangle of grid of equilateral triangles 240 has a side length 270. In the present example, side length 270 is between approximately one and five inches.

Varying cap width 268 may alter the moment of inertia of the stiffening structure and thereby alter the stiffness of the equipment panel. Because damping layer 224 is applied to the upper surface of cap 262, altering the moment of inertia of the stiffening structure may also alter the damping properties of the equipment panel. Varying triangle side length 270 may alter the density of stiffening structure 236 on facesheet 230, thereby altering the stiffness of the equipment panel. Thicknesses of equipment panel 220 may also be tuned to achieve desired panel properties. Facesheet 230 has a thickness 272, and damping layer 224 has a thickness 274. In the present example, web 260 and cap 262 each have the same thickness as facesheet 230. In some examples, the web and cap may have different thicknesses.

In the present example, facesheet thickness is between approximately 0.05 and 0.125 inches. This range may provide sufficient radiation shielding for typical satellite equipment without adding unnecessary weight. An appropriate thickness may depend at least in part on the material of facesheet 230. In the present example, damping layer thickness 274 is between approximately 0.5 and 5 millimeters. This range may provide sufficient vibration damping for typical satellite equipment within expected frequency and amplitude ranges. An appropriate thickness may depend at least in part on the material of damping layer 224 and dimensions of stiffening structure 236 such as cap width 268.

In the present example, each of dimensions depth 266, width 268, length 270, thickness 272, and thickness 274 is constant throughout equipment panel 220. In some examples, one or more of the dimensions may vary across the panel, to achieve localized or targeted variation in the properties of the panel. For example, a region of the panel may have decreased length 270 and increased width 268 to provide additional stiffness needed to support a particularly massive piece of equipment mounted proximate the region. For another example, a region of the panel may have increased thickness 272 to provide additional shielding for particularly radiation sensitive equipment.

C. Illustrative Method of Additive Manufacture

Figure 9:
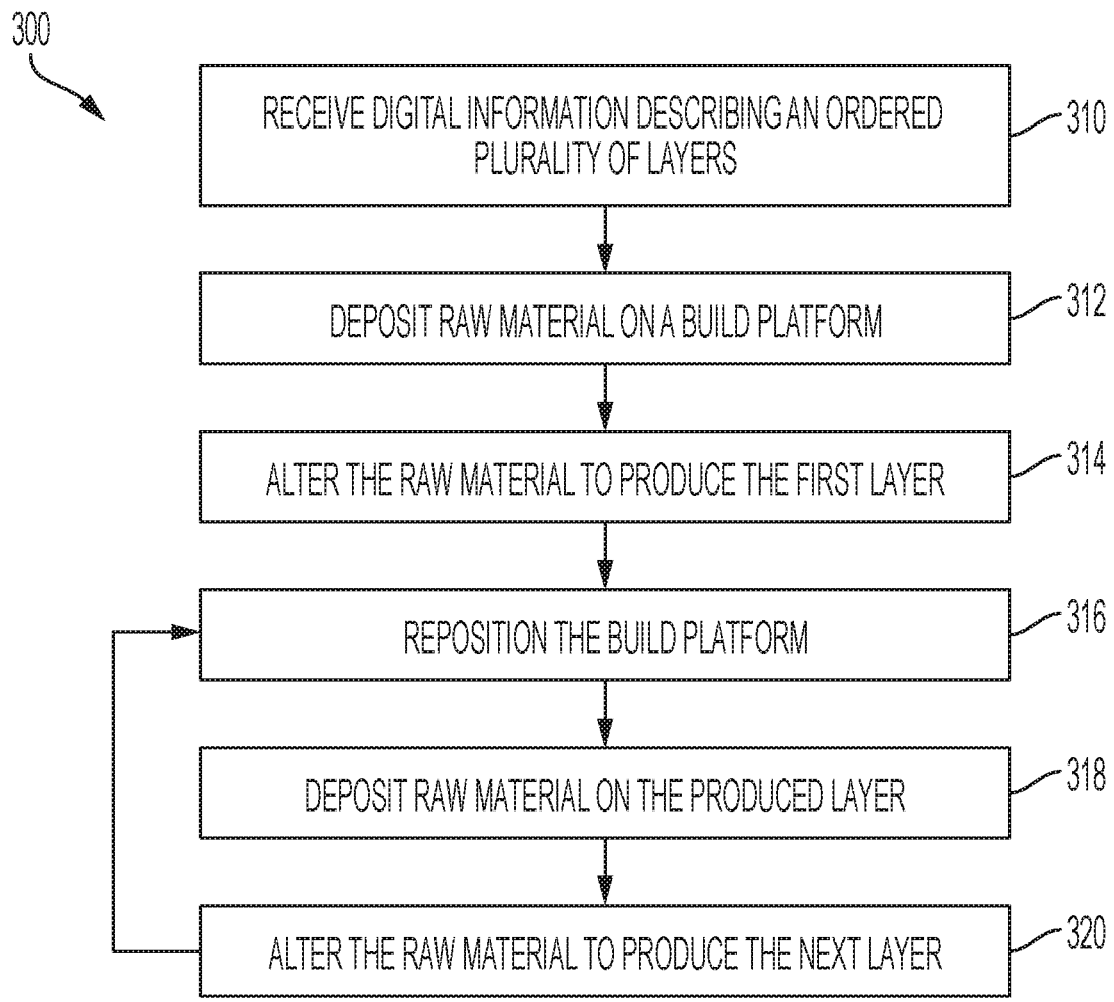
FIG. 9 is a flow chart depicting steps of an illustrative method of additive manufacture.

This section describes steps of an illustrative method 300 for additive manufacture of a workpiece; see FIG. 9. Aspects of an illustrative additive manufacturing device depicted in FIG. 10 may be utilized in the method steps described below. Where appropriate, reference may be made to components and systems that may be used in carrying out each step. These references are for illustration, and are not intended to limit the possible ways of carrying out any particular step of the method.

In some examples, method 300 may also be referred to as a method of 3-D printing. The terms additive manufacture and 3D printing may both be understood to include processes in which an object is created by adding material in successive layers. Additive manufacture may be understood as a broader term, encompassing 3D printing.

In some examples, interchangeable usage of the terms additive manufacture and 3D printing may be appropriate. In the present disclosure, printing and/or a printing step may be understood to include creation by any method of additive manufacture. Examples of additive manufacturing processes include, but are not limited to, material extrusion, powder bed fusion, material jetting, binder jetting, directed energy deposition, vat photopolymerization, and sheet lamination.

FIG. 9 is a flowchart illustrating steps performed in illustrative method 300, and may not recite the complete process or all steps of the method. Although various steps of method 300 are described below and depicted in FIG. 9, the steps need not necessarily all be performed, and in some cases may be performed simultaneously or in a different order than the order shown.

Figure 10:
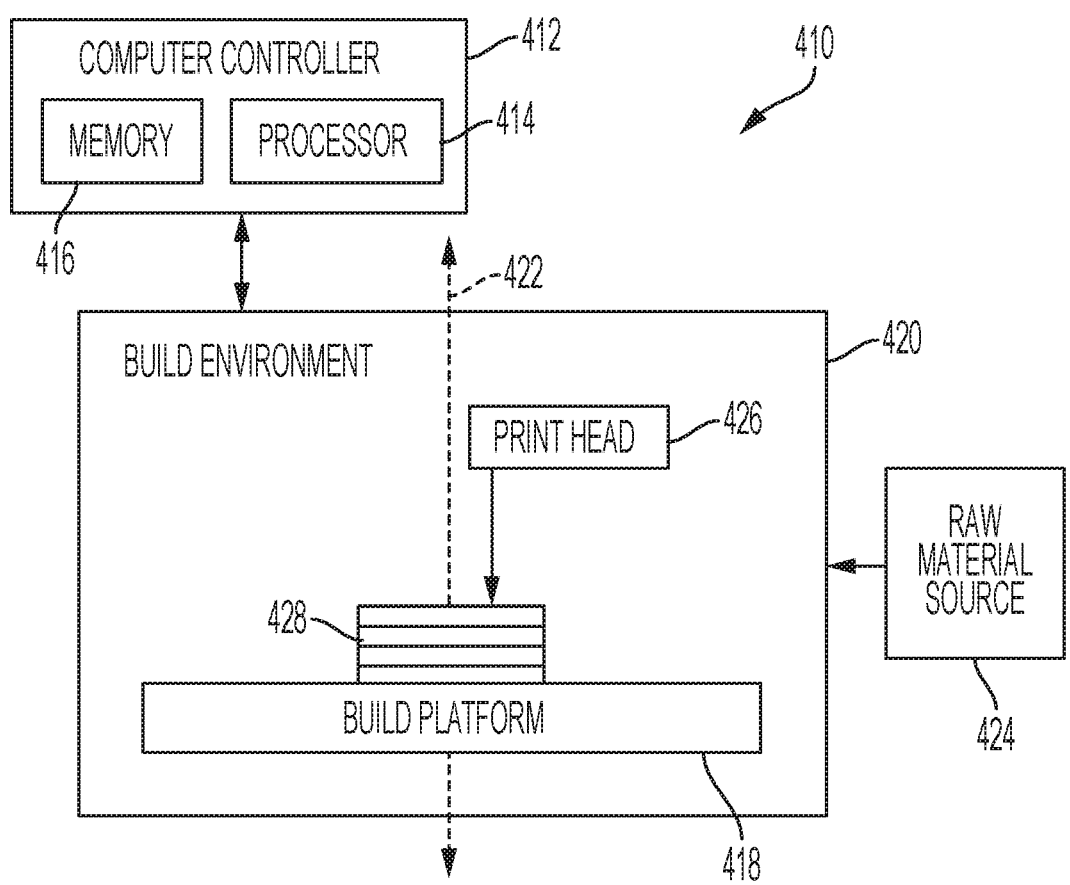
FIG. 10 is a schematic diagram of an illustrative additive manufacturing apparatus.

At step 310, digital information describing an ordered plurality of layers is received. The digital information may be received by a computer controller 412 of an additive manufacturing device 410 as depicted in FIG. 10. The additive manufacturing device may also be referred to as a printer, or a fabricator. Computer controller 412 may comprise any data processing system configured to receive digital design information and control functions of printer 410. The illustrative computer controller shown in FIG. 10 includes a processor 414 for controlling printer functions and memory 416 for storing received data.

The received information may include geometric data and/or design details for a plurality of two-dimensional patterns that constitute layers of a three-dimensional object, where the three-dimensional object is a workpiece 428 to be manufactured. The layers may also be described as cross-sections or slices. The plurality of layers is ordered, such that the layers may be numbered or organized from a first layer to a last layer.

Step 312 of method 300 includes depositing raw material on a build platform 418 located in a building environment 420 of printer 410. The build platform may comprise a support moveable by computer controller 412 along a manufacturing axis 422. The build platform may have a planar surface perpendicular to manufacturing axis 422.

The raw material may be any material appropriate to additive manufacturing, typically a fluid or powder and including but not limited to photopolymer resin, thermoplastic, plaster, ceramic, and metal. The material may be distributed from a raw material source 424 such as a hopper, a tank, or a powder bed. For example, aluminum powder may be swept from a powder bed over build platform 418 by a brush arm actuated by computer controller 412.

The raw material may be distributed evenly over build platform 418, or may be deposited in a selected pattern. Depositing may be done under control of computer controller 412. In some examples, build platform 418 may be submerged in raw material and depositing may be accomplished by gravity or fluid pressure. In some examples, a print head 426 connected to raw material source 424 may deposit the raw material in a pattern corresponding to the first layer of the ordered plurality of layers.

At step 314, the raw material is altered to produce the first layer. In other words, a physical change is induced the deposited material, according to the design information describing the first layer of the ordered plurality of layers and as directed by the computer controller 412, to realize the first layer as a physical object on the build platform.

The material may be acted on by a print head 426 of printer 410, controlled by computer controller 412. For example, the print head may include a laser that cures a photopolymer by exposure to light or sinters a metal powder by exposure to heat. The print head may be directed by computer controller 412 to follow a path delineated in the received digital information for the first layer, and/or a path calculated by processor 414 based on the received digital information.

Step 316 includes repositioning build platform 418. In some examples, build platform 418 may start a selected distance from print head 426. The selected distance may be determined by the procedures performed by the print head. Subsequent to production of a layer, the build platform may be repositioned by computer controller 412 along manufacturing axis 422 away from print head 426 by the layer's thickness. That is, the build platform may be moved such that a top surface of the produced layer is the selected distance from print head 426.

In some examples, build platform 418 may start in alignment with another element of printer 410 such as a raw material distribution component. Subsequent to production of a layer, the build platform may be repositioned by computer controller 412 along manufacturing axis 422 such that a top surface of the produced layer is aligned with the other element of printer 410. In some examples, at step 316 print head 426 may be repositioned instead of or in addition to build platform 418. In some examples, step 316 may be skipped.

At step 318, raw material is deposited on the layer produced in the preceding step of method 300. As described for step 312, the raw material may be any appropriate material and may be deposited any appropriate manner. At step 320, the raw material is altered to produce the next layer as previously described for step 314.

Steps 316 through 320 may be repeated to produce each layer of the plurality of layers of the received digital information, until the last layer is produced. The produced first through last layers may then comprise workpiece 428 as described in the received digital information. The workpiece may be removed from the printer and post-processed as desired. For example, the workpiece may be machined from a build plate of the build platform, and then fine details or smooth surfaces may be further finished by machining or other methods.

Workpiece 428 manufactured according to method 300 may possess different structural properties as compared to a workpiece manufactured according to traditional manufacturing methods such as machining, molding, and/or assembly. For example, all parts and/or features of workpiece 428 may be integral and/or monolithic. For another example, workpiece 428 may comprise a plurality of fused layers of material, where each layer is perpendicular to a build axis of the workpiece. For another example, workpiece 428 may include microstructural anisotropy resulting from the directionality of the manufacturing process.

D. Illustrative Method of Satellite Manufacture

Figure 11:
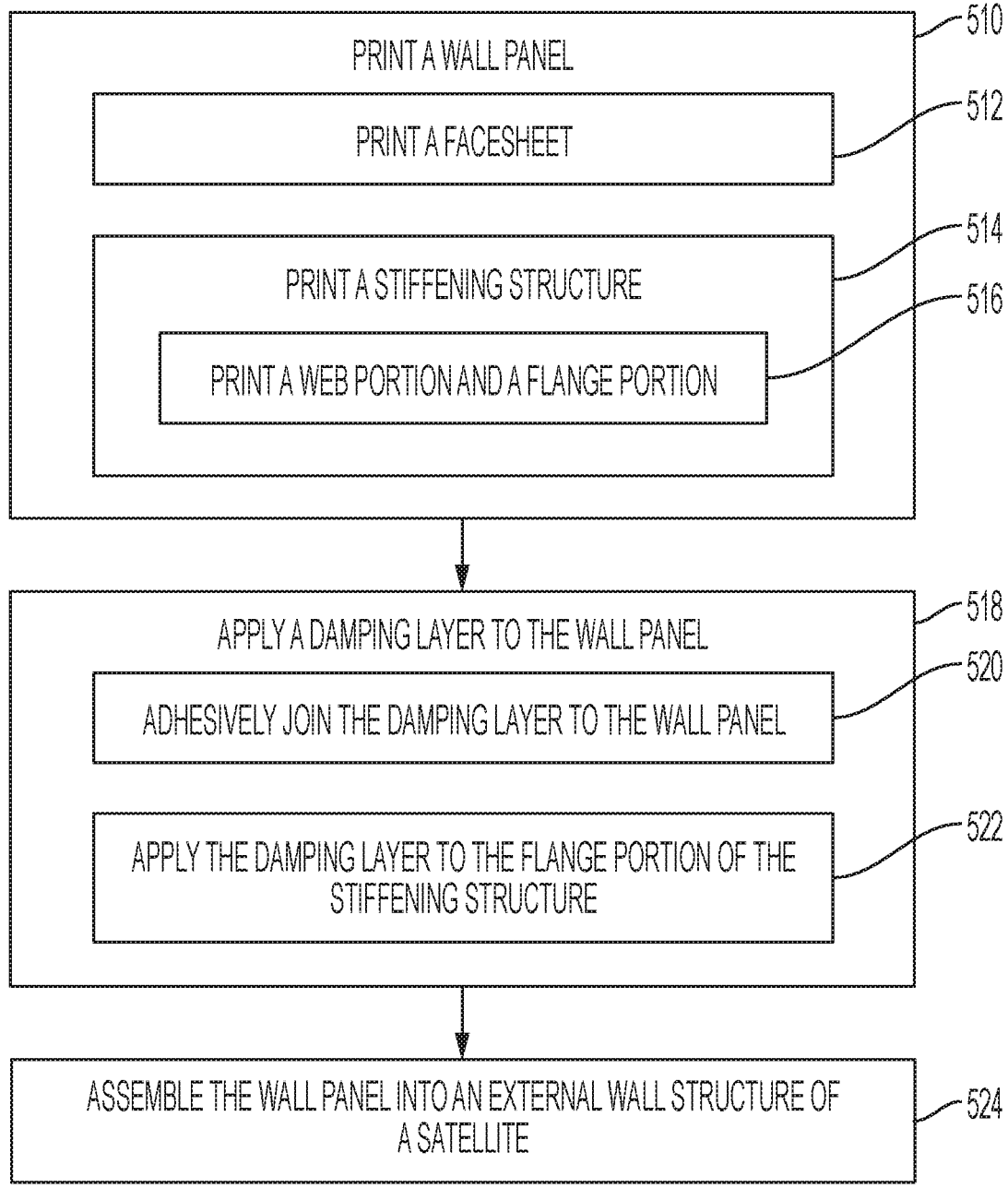
FIG. 11 is a flow chart depicting steps of an illustrative method of manufacturing a satellite, according to the present teachings.

This section describes steps of an illustrative method 500 for manufacturing a satellite; see FIG. 11. Aspects of satellites, panels, and/or additive manufacturing methods and apparatus described above may be utilized in the method steps described below.

Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. Although various steps of method 500 are described below and depicted in FIG. 11, the steps need not necessarily all be performed, and in some cases may be performed simultaneously or in a different order than the order shown.

At step 510, the method includes printing a wall panel. The wall panel may be printed according to any effective additive manufacturing method, such as method 300 described above. The panel may be printed of any material, including but not limited to laser sintered metal or metal alloy.

Substep 512 of step 510 includes printing a facesheet. The facesheet may be printed according to a build direction of the additive manufacturing apparatus used. In the present example, the facesheet may be printed at an angle between approximately 30 and 45 degrees with the build direction. The thickness of the facesheet may be selected according to desired radiation shielding or blocking properties of the wall panel. In some examples, the facesheet may be square or rectangular in shape. The facesheet may include a first side and a second side. In some examples, the first side may comprise an outer or exterior side and the second side may comprise an inner or interior side. Substep 514 of step 510 includes printing a stiffening structure. The stiffening structure may be printed on the first side of the facesheet. The stiffening structure may also be described as printed on a first side of the wall panel. The stiffening structure may comprise a regular, repeating grid or lattice extending from the facesheet and/or may include localized shapes and features. In some examples, at least a portion of the stiffening structure may form a grid of equilateral triangles. In such an example, the wall panel may be described as an isogrid.

Sub-step 516 of step 514 includes printing a web portion and a flange portion of the stiffening structure. The web portion may extend from the facesheet, and the flange portion may extend from a distal end of the web portion. The stiffening structure may be described as a T-beam, or as forming an I-beam with the facesheet. Dimensions of the stiffening structure such as a width of the flange portion may be selected according to desired stiffness of the wall panel and moment of inertia of the stiffening structure.

The stiffening structure may be printed concurrently with the facesheet. In other words, sub-steps 512 and 514 may be performed simultaneously. Each layer of material deposited during printing may include a portion of the facesheet, and a portion of the stiffening structure. The facesheet and the stiffening structure may be printed as a single monolithic structure. In other words, the facesheet and stiffening structure may be printed together to form a panel of printed material without joints or seams.

Method 500 may not include post-processing of the printed wall panel. That is, the panel may be designed and printed such that smoothing of surface roughness, removal of sacrificial supporting material, and/or machining of additional features is not required At step 518 the method includes applying a damping layer to the wall panel. The applied layer may comprise any high loss-factor material appropriate to free-layer damping. Examples include but are not limited to elastomer, natural or synthetic rubber, acrylic tape, silicone, and other viscoelastic materials. Properties of the damping layer such as thickness, stiffness, loss factor, and/or distribution may be selected according to desired damping properties of the wall panel. For example, a hardness of the damping layer may be selected according to a resonant frequency of equipment to be mounted to the wall panel.

The damping layer may be applied in any effective manner. In the present example, sub-step 520 of step 518 includes adhesively joining the damping layer to the wall panel. The damping layer may be molded, punched, rolled, cut, and/or otherwise formed and then bonded to the wall panel with a pressure sensitive adhesive. In some examples, the damping layer may be sprayed, painted, rolled, and/or otherwise formed directly onto the wall panel and then dried or cured in place. The damping layer may be applied to some or all of the wall panel. For example, the damping layer may be applied only to a first side of the wall panel and may be applied in a continuous sheet, a pattern, and/or multiple discontinuous sections. In the present example, sub-step 522 of step 518 includes applying the damping layer to the flange portion of the stiffening structure of the wall panel. The damping layer may substantially cover an upper or outer surface of the flange portion.

Step 524 of method 500 includes assembling the wall panel into an external wall structure of a satellite. The external wall structure may also be described as a main body and/or primary structure of the satellite. Assembling the wall panel into the external wall structure may include connecting the wall panel to one or more additional panels. The wall panel may be connected along an edge or side region, and may be connected in plane or at an angle relative to another panel. The panel may be connected by any effective means. For example, the panel may be welded and/or bolted to an adjacent panel. In some examples, step 510 may include printing connection features such as brackets or fastener apertures configured to facilitate assembly of the wall panel into the external wall structure.

Illustrative Combinations and Additional Examples

This section describes additional aspects and features of satellites and additively manufactured panels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A satellite comprising:

a body having an additively manufactured wall panel including a facesheet and a stiffening structure extending from a first side of the facesheet, and a communication device connected to the body configured to send and receive data while in space.

A1. The satellite of A0, wherein the facesheet and the stiffening structure form an isogrid.

A2. The satellite of A0 or A1, wherein the first side of the facesheet is external to the satellite.

A3. The satellite of any of A0-A2, wherein the first side of the facesheet is internal to the satellite.

A4. The satellite of any of A0-A3, wherein the stiffening structure includes a web portion and a flange portion.

A5. The satellite of A4, further comprising:
a damping layer adhered to the flange portion of the stiffening structure.

A6. The satellite of A5, wherein the damping layer comprises a viscoelastic material.

A7. The satellite of A5 or A6, wherein the stiffening structure and damping layer form a grid of equilateral triangles on the first side of the wall panel.

A8. The satellite of any of A0-A7, further comprising:
a damping layer adhered to the wall panel.

A9. The satellite of A8, wherein the damping layer is external to the satellite.

A10. The satellite of A8 or A9, wherein the damping layer is internal to the satellite.

A11. The satellite of any of A0-A10, wherein the stiffening structure is sandwiched between the facesheet and an additional facesheet.

A12. The satellite of A11, wherein the stiffening structure is a truss.

B0. A wall panel for a satellite, comprising:
an additively manufactured expanse configured to form part of an external wall structure of a satellite, the expanse having a first side and a second side, and
a stiffening structure on the first side of the expanse, the second side of the expanse being configured for supporting satellite equipment.

B1. The wall panel of B0, wherein the expanse and the stiffening structure are part of a single monolithic structure.

B2. The wall panel of B1, wherein the expanse and stiffening structure are comprised of laser sintered metal alloy.

B3. The wall panel of any of B0-B2, wherein the expanse and the stiffening structure form an isogrid.

B4. The wall panel of any of B0-B3, wherein the stiffening structure has a web portion and a flange portion.

B5. The wall panel of claim B4, further comprising:
a damping layer adhered to the flange portion of the stiffening structure.

B6. The wall panel of B4, wherein the second side of the wall panel is configured to support mounting of equipment.

B7. The wall panel of any of B0-B6, further comprising:
a damping layer mounted on the expanse.

B8. The wall panel of B7, wherein the damping layer is adhered to the first side of the expanse C0. A method of manufacturing a satellite, comprising:
printing a wall panel including a facesheet and printing a stiffening structure on the facesheet, and
assembling the wall panel into an external wall structure of a satellite.

C1. The method of C0, wherein the facesheet and the stiffening structure form an isogrid.

C2. The method of C0 or C1, wherein the stiffening structure includes a web portion and a flange portion.

C3. The method of C2, further comprising:
applying a damping layer on the flange portion of the stiffening structure.

C4. The method of any of C0-C3, wherein the facesheet has an inner side and an outer side, the stiffening structure extending from the outer side of the facesheet.

D0. A wall panel for a satellite, comprising:
an additively manufactured expanse configured to form part of an external wall structure of a satellite, the expanse having a first side and a second side, and
a damping layer adhered to the first side of the expanse.

D1. The wall panel of D0, wherein the first side is configured to face space.

D2. The wall panel of D0 or D1, wherein the second side is configured to support equipment inside an enclosure of the satellite.

D3. The wall panel of any of D0-D2, wherein the first side of the expanse includes a stiffening structure.

D4. The wall panel of D3, wherein the expanse is an isogrid.

D5. The wall panel of D3 or D4, wherein the stiffening structure includes a web portion and a flange portion.

D6. The wall panel of D5, wherein the damping layer is mounted on the flange portion of the stiffening structure.

D7. The wall panel of any of D0-D6, wherein the expanse is comprised of laser sintered metal alloy.

D8. The wall panel of D7, wherein the expanse is comprised of aluminum.

D9. The wall panel of any of D0-D8, wherein the damping layer is comprised of viscoelastic material.

D10. The wall panel of any of D0-D9, wherein the expanse includes a monolithic sandwich structure.

D11. The wall panel of any of D0-D10, wherein the expanse includes a facesheet having a thickness sufficient to block at least 0.5 megarads per year of radiation from outside the compartment.

E0. A wall panel for a satellite, comprising:
an additively manufactured expanse configured to form part of an external wall structure of a satellite, the expanse having a first side and a second side, and
a damping layer on the first side of the expanse.

E1. The wall panel of E0, wherein the damping layer is comprised of viscoelastic material.

E2. The wall panel of E0 or E1, wherein the damping layer is adhesively joined to the first side of the expanse.

E3. The wall panel of any of E0-E2, wherein the damping layer has a thickness of 0.2 to 5.0 millimeters.

E4. The wall panel of any of E0-E3, wherein the damping layer has a thickness of 0.5 to 2.0 millimeters.

E5. The wall panel of any of E0-E4, wherein the expanse is comprised of laser sintered metal alloy.

E6. The wall panel of E5, wherein the expanse is comprised of aluminum.

E7. The wall panel of any of E0-E6, wherein the damping layer forms a grid of equilateral triangles.

E8. The wall panel of any of E0-E7, wherein the expanse has a stiffening structure on the first side of the expanse.

E9. The wall panel of E8, wherein the stiffening structure has a web portion and a flange portion, the damping layer being mounted on the flange portion of the stiffening structure.

F0. A method of manufacturing a satellite, comprising:
printing a wall panel including a facesheet having a first side and a second side, applying a damping layer to the wall panel, and
assembling the wall panel into an external wall structure of a satellite.

F1. The method of F0, wherein the damping layer is comprised of a viscoelastic material.

F2. The method of F0 or F1, wherein the applying step includes adhesively joining the damping layer to the wall panel.

F3. The method of any of F0-F2, wherein the damping layer has a thickness between 0.2 to 5.0 millimeters.

F4. The method of any of F0-F3, wherein the damping layer has a thickness between 0.5 to 2.0 millimeters.

F5. The method of any of F0-F4, wherein the damping layer covers most of the first side of the facesheet.

F6. The method of any of F0-F5, wherein the damping layer forms a grid of equilateral triangles on the first side of the facesheet.

F7. The method of any of F0-F6, further comprising: printing a stiffening structure of the first side of the facesheet.

F8. The method of F7, wherein the damping layer is applied to the stiffening structure.

F9. The method of F7 or F8, wherein the facesheet and the stiffening structure form an isogrid.

F10. The method of any of F7-F9, wherein the stiffening structure has a web portion and a flange portion, the damping layer being applied to the flange portion of the stiffening structure.

Advantages, Features, and Benefits

The different examples of the additively manufactured satellite panel described herein provide several advantages over known solutions for designing and manufacturing satellites. For example, illustrative examples described herein allow rapid, on-demand production of panels.

Additionally, and among other benefits, illustrative examples described herein reduce manufacturing cycle time, including reducing the number of manufacturing steps, the touch labor time, and the post-production testing.

Additionally, and among other benefits, illustrative examples described herein allow effective protection of sensitive equipment from launch-associated vibrational loading, despite reduced integral damping of an additively manufactured panel.

Additionally, and among other benefits, illustrative examples described herein allow effective protection of sensitive equipment from potentially damaging space radiation, with a strong, stiff, and lightweight panel.

Additionally, and among other benefits, illustrative examples described herein allow high levels of customization and localized design, including features such as localized reinforcement or radiation spot shielding, access points, stiffness tuning, integral payload-specific equipment mounts, and tailoring for expected vibrational loading and equipment tolerances.

No known system or device can perform these functions, particularly for high-strength and light-weight metallic alloy panels. Thus, the illustrative examples described herein are particularly useful for satellite structural panels. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A satellite comprising:
   a body having an equipment panel including a facesheet and a stiffening structure including a web portion extending from an external side of the facesheet and a flange portion extending from a distal end of the web portion,
   a damping layer adhered to the flange portion of the stiffening structure,
   payload equipment mounted to an internal side of the facesheet, and
   a communication system connected to the body configured to send and receive data while in space,
   wherein the facesheet and the stiffening structure are part of a single monolithic structure.

2. The satellite of claim 1, wherein the facesheet and the stiffening structure form an isogrid.

3. The satellite of claim 1, wherein the damping layer comprises a viscoelastic material.

4. The satellite of claim 1, wherein the equipment panel is located to damp axial loads on the satellite during launch.

5. The satellite of claim 4, wherein the equipment panel is opposite a separation system on the body.

6. The satellite of claim 1, wherein the damping layer is a single continuous layer.

7. The satellite of claim 6, wherein the stiffening structure forms an intersecting grid and the damping layer has a corresponding intersecting grid shape.

8. The satellite of claim 1, wherein the body is between ten and thirty inches in width and the facesheet has a thickness between 0.05 and 0.125 inches.

9. The satellite of claim 8, wherein the damping layer has a thickness between 0.5 and 5 millimeters.

10. The satellite of claim 1, wherein a hardness of the damping layer is selected according to a resonant frequency of the payload equipment.

11. The satellite of claim 10, wherein the damping layer has a hardness between 20 and 60 on the Shore A hardness scale.

12. A wall panel for a satellite, comprising:
    an additively manufactured expanse configured to form part of an external wall structure of a satellite, the expanse having a first side and a second side,
    a stiffening structure on the first side of the expanse and integral with the expanse, the stiffening structure forming an intersecting grid and including a web portion extending from the expanse and a flange portion perpendicular to the web portion, and
    a single continuous damping layer adhered to and covering the flange portion of the stiffening structure.

13. The wall panel of claim 12, wherein the expanse and stiffening structure are comprised of laser sintered metal alloy.

14. The wall panel of claim 12, wherein the expanse and the stiffening structure form an isogrid.

15. The wall panel of claim 12, wherein the expanse includes side walls extending from each outer edge.

16. The wall panel of claim 15, wherein the side walls have a scalloped edge.

17. The wall panel of claim 12, where the web portion and the flange portion of the stiffening structure are each planar.

18. The wall panel of claim 17, wherein the expanse is planar and rectangular.

19. The wall panel of claim 18, wherein the grid of the stiffening structure intersects at hexagonal nodes.

20. A method of manufacturing a satellite, comprising:
   printing a wall panel including a facesheet and printing a stiffening structure on an external side of the facesheet as a single monolithic structure, including printing a web portion and a flange portion, the web portion extending from the facesheet and the flange portion extending from a distal end of the web portion,
   adhering a damping layer to the flange portion of the stiffening structure,
   assembling the wall panel into an external wall structure of a satellite, and
   mounting payload equipment to an internal side of the facesheet and connecting a communication system configured to send and receive data while in space to the external wall structure.

* * * * *